(12) United States Patent
Karako

(10) Patent No.: US 12,049,309 B2
(45) Date of Patent: Jul. 30, 2024

(54) CARRYING APPARATUS

(71) Applicant: Cem Karako, Istanbul (TR)

(72) Inventor: Cem Karako, Istanbul (TR)

( * ) Notice: Subject to any disclaimer, the term of this patent is extended or adjusted under 35 U.S.C. 154(b) by 354 days.

(21) Appl. No.: 17/618,520

(22) PCT Filed: Feb. 7, 2020

(86) PCT No.: PCT/TR2020/050085
§ 371 (c)(1),
(2) Date: Dec. 13, 2021

(87) PCT Pub. No.: WO2021/006837
PCT Pub. Date: Jan. 14, 2021

(65) Prior Publication Data
US 2022/0234732 A1    Jul. 28, 2022

(30) Foreign Application Priority Data

Jul. 9, 2019 (TR) .................................. 2019/10265

(51) Int. Cl.
*B64C 39/02* (2023.01)
*B65D 25/00* (2006.01)
*B64U 101/60* (2023.01)

(52) U.S. Cl.
CPC ............ *B64C 39/024* (2013.01); *B65D 25/00* (2013.01); *B64U 2101/60* (2023.01)

(58) Field of Classification Search
CPC .. B64C 39/024; B65D 25/00; B64U 2101/60; B64U 2101/64; B64U 2101/67; B64D 1/08; Y10S 220/13
See application file for complete search history.

(56) References Cited

U.S. PATENT DOCUMENTS

| | | | | |
|---|---|---|---|---|
| 10,464,711 B2 * | 11/2019 | Tsui | .................. | A47J 27/21008 |
| D873,501 S * | 1/2020 | Peng | ........................... | D30/127 |
| 10,683,091 B2 * | 6/2020 | Sopper | ................ | B65D 5/2023 |
| 11,155,351 B2 * | 10/2021 | Sopper | .............. | B65D 81/3888 |
| D1,005,785 S * | 11/2023 | Yue | ................................. | D7/532 |
| 2022/0089354 A1 * | 3/2022 | Mangelsen | ........ | B65D 81/3848 |

FOREIGN PATENT DOCUMENTS

| | | |
|---|---|---|
| CN | 106167091 A | 11/2016 |
| CN | 208585412 U | 3/2019 |
| CN | 109911206 A | 6/2019 |
| KR | 101826194 B1 | 2/2018 |

* cited by examiner

*Primary Examiner* — Corey N Skurdal

(74) *Attorney, Agent, or Firm* — Bayramoglu Law Offices LLC

(57) ABSTRACT

A carrying apparatus associated with drones and similar vehicles, and carrying a passenger or a load is provided. The carrying apparatus includes a center part having a predefined geometrical shape, a first lateral wall encircling a volume, wherein the first lateral wall begins in a manner encircling the center part and decreases towards a first end provided at a first direction and a second lateral wall, wherein the second lateral wall begins in the manner encircling the center part and decreases towards a second end provided at a second direction.

9 Claims, 13 Drawing Sheets
(11 of 13 Drawing Sheet(s) Filed in Color)

CARRYING APPARATUS

CROSS REFERENCE TO THE RELATED APPLICATIONS

This application is the national stage entry of International Application No. PCT/TR2020/050085, filed on Feb. 7, 2020, which is based upon and claims priority to Turkish Patent Application No. 2019/10265 filed on Jul. 9, 2019, the entire contents of which are incorporated herein by reference.

TECHNICAL FIELD

The present invention relates to a carrying apparatus which provides carrying passenger or load in drones and similar vehicles.

BACKGROUND

Drone is unmanned air vehicle which can be easily guided by means of remote control or software management. Drones or unmanned air vehicles are used in an active manner by various different sectors. Drones which gained popularity particularly in the recent years can realize various duties like communication, advertising, search and rescue works and cargo transportation.

Drones can carry loads with specific capacity according to their technical characteristics. Thus, it is possible to deliver a package, envelope or coli to an address by means of a drone. Today, pluralities of companies realize R&D studies about order delivery by means of drones. By means of this, it is planned to deliver specific orders by means of drones.

In the literature, there is the utility model application with application number CN208585412U and with title "consumable material carrying hanger for unmanned airplane". In said application, a kind of carrying hanger, particularly a carrying hanger which is suitable for carrying material for drones. In order to solve the technical problem, said invention comprises an assembly bracket, a first bracket, a second bracket, an assembly component, a discharge component, an electrical pushing rod, a carriage shelf which is suitable for the placement of a material.

As a result, because of all of the abovementioned problems, an improvement is required in the related technical field.

SUMMARY

The present invention relates to a carrying apparatus, for eliminating the above mentioned disadvantages and for bringing new advantages to the related technical field.

An object of the present invention is to provide a carrying apparatus for use in drones, which provides carrying of passenger or load in a manner moving with minimum friction and drifting to any direction in air, in aerodynamic lifting-off and landing.

Another object of the present invention is to provide a carrying apparatus which will be affected by air movements with minimum manner and which will use maximum volume for carrying extra load.

In order to realize the abovementioned objects and the objects which are to be deducted from the detailed description below, the present invention relates to a carrying apparatus which is associated with drones and similar vehicles and which provides carrying passenger or load. Accordingly, said carrying apparatus comprises a center part having a predefined geometrical shape, a first lateral wall which encircles a volume which begins in a manner encircling said center part and which decreases towards a first end provided at a first direction and a second lateral wall which begins in a manner encircling said center part and which decreases towards a second end provided at a second direction. Thus, a carrying apparatus is provided which provides carrying load in a manner moving with minimum friction and drifting to any direction in air, in aerodynamic lifting-off and landing.

In a possible embodiment of the present invention, said center part is in circular form.

In a possible embodiment of the present invention, said center part is in square form.

In a possible embodiment of the present invention, said center part is in equilateral triangle form.

In a possible embodiment of the present invention, the surface of said first lateral wall and the surface of said second lateral wall comprise more than one layer in cylindrical form positioned one above the other. Thus, minimum friction is provided during the movement of the carrying apparatus.

In a possible embodiment of the present invention, more than one depression is provided with respect to any one or ones of the polygonal, circular and ellipse forms provided on the first lateral wall and on the second lateral wall surfaces. Thus, the friction coefficient of the carrying apparatus is reduced.

In a possible embodiment of the present invention, at least one hook is provided on the first end for providing associating with the drone.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

REFERENCE NUMBERS

Figure 1:
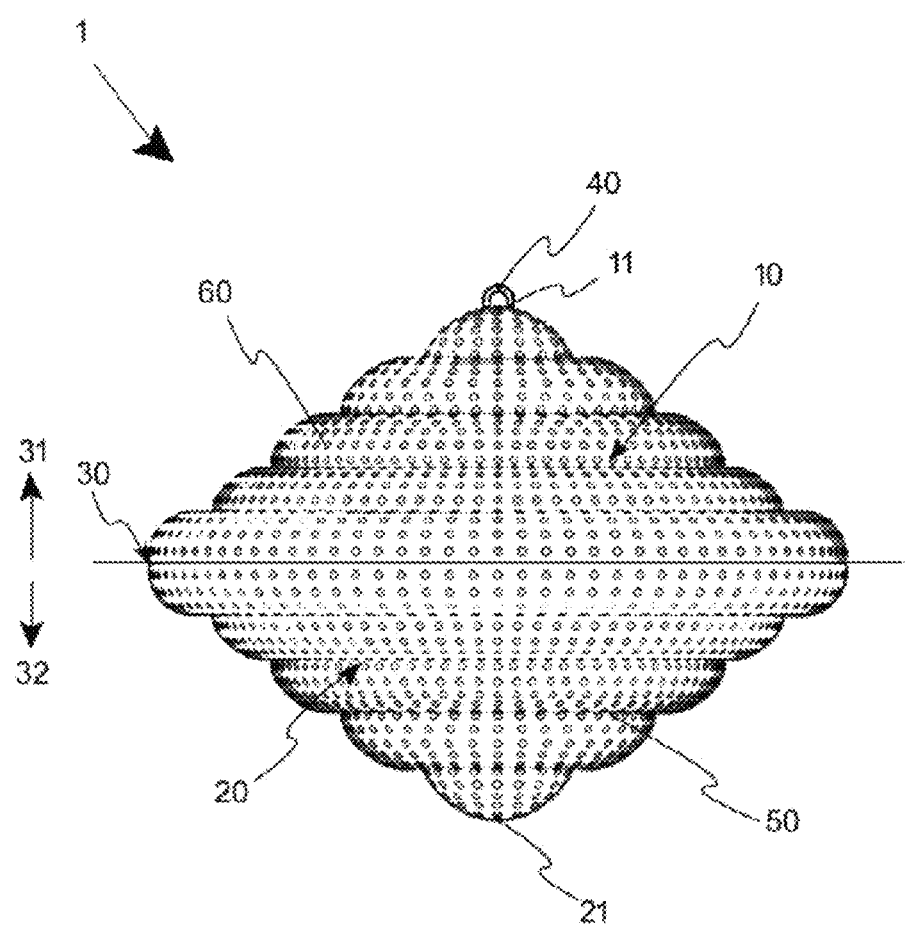
FIG. 1 is a lateral view of the subject matter carrying apparatus.

1 Carrying apparatus
10 First lateral wall
  11 First end
20 Second lateral wall
  21 Second end
30 Center part
  31 First direction
  32 Second direction
40 Hook
50 Layer
60 Depression

DETAILED DESCRIPTION OF THE EMBODIMENTS

In this detailed description, the subject matter carrying apparatus (1) is explained with references to examples without forming any restrictive effect only in order to make the subject more understandable.

In FIG. 1, a lateral view of the subject matter carrying apparatus (1) is given. The present invention relates to a carrying apparatus (1) for use in drones and similar vehicles and which provides carrying passenger or load in a manner moving with minimum friction in air, in aerodynamic lifting-off and landing. In said carrying apparatus (1), there is a center part (30) which has a pre-defined geometrical shape. There is a first lateral wall (10) which encircles a volume which begins in a manner encircling said center part (30) and which decreases towards a first end (11) provided at a first direction (31) and a second lateral wall (20) which begins in a manner encircling said center part (30) and which decreases towards a second end (21) provided at a second direction (32). At least one hook (40) is provided on said first end (11) for providing associating of the carrying apparatus (1) with the drone.

Figure 2:
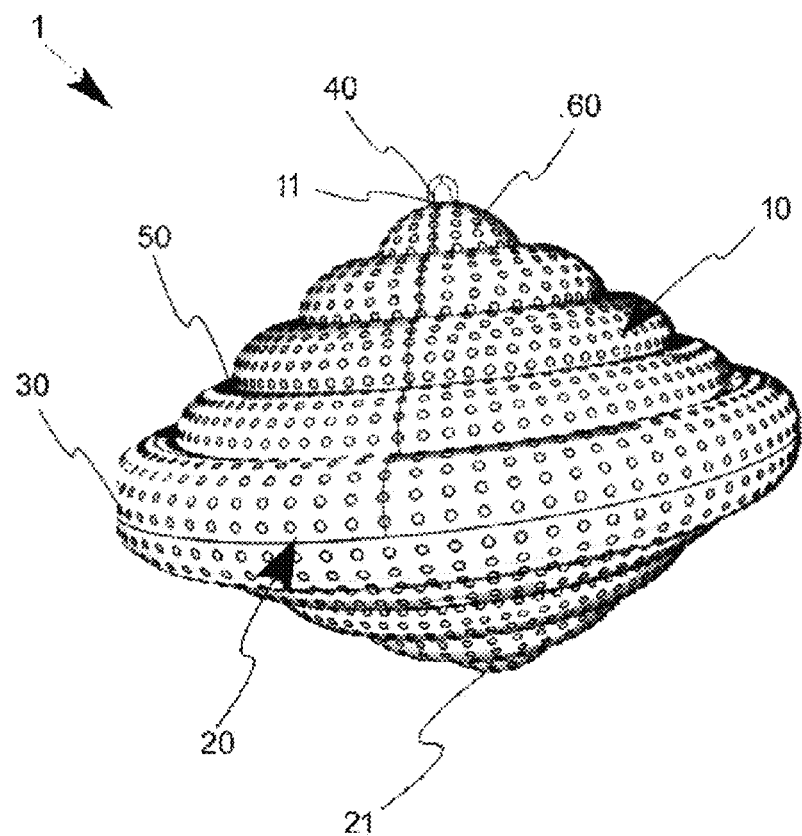
FIG. 2 is a perspective view of the subject matter carrying apparatus.
Figure 3:
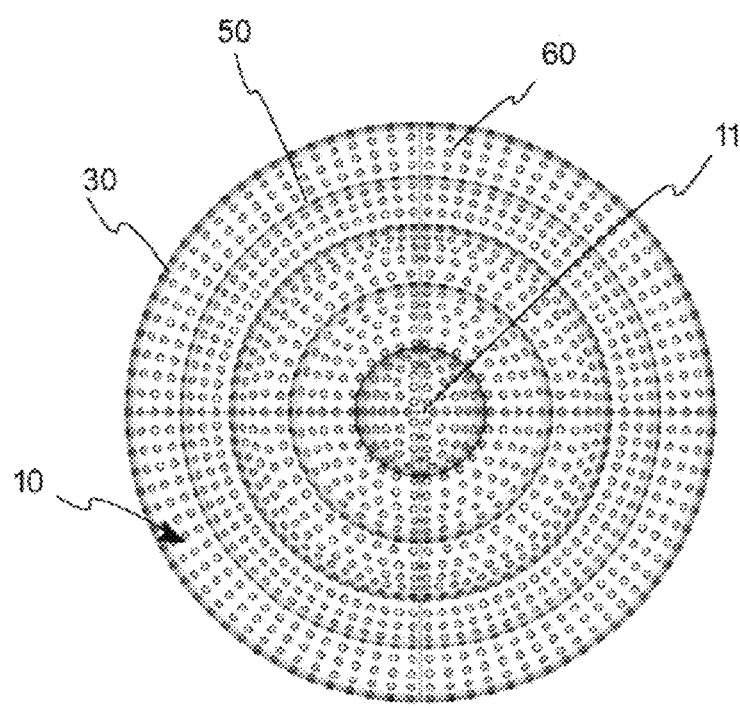
FIG. 3 is a representative top view of the subject matter carrying apparatus.

In FIG. 2, a representative perspective lateral view of the subject matter carrying apparatus (1) is given. The center part (30) can have a geometrical form like circle, square or equilateral triangle. In the preferred embodiment of the present invention, the center part (30) has a circular form. There is a chamber structure between the first lateral wall (10) which encircles a volume decreasing from the center part (30) towards the first end (11) provided at said first direction (31) and the second lateral wall (20) which encircles a volume decreasing from the center part (30) towards the second end (21) provided at said second direction (32). Desired load can be placed into said chamber. In the preferred embodiment of the present invention, the first lateral wall (10) can be in conical shape which extends from the center part (30) towards the first end (11) and the second lateral wall (20) can be in inverse-conical shape which extends from the center part (30) towards the second end (21).

While realizing maneuver for changing direction, drones can move in any direction any time without realizing maneuver like rotocopter or multicopter in an opposite manner to airplanes. The carrying apparatus (1) associated with the drone has an equal surface structure in all orthogonal or horizontal movements. Since the chamber is narrowed at the bottom in the orthogonal plane, the load, carried in the chamber, stays at the bottom part of the chamber and the weight center of the carrying apparatus (1) is prevented from being deteriorating.

In the carrying apparatus (1), there may be more than one layer (50) in cylindrical form positioned one above the other on the first lateral wall (10) and on the second lateral wall (20) surfaces. Thanks to said cylindrical layer (50) structure provided on the first lateral wall (10) and on the second lateral wall (20) surface, minimum friction is provided in the carrying apparatus (1) during movement. Drones basically move orthogonally for lifting-off and they move horizontally during the trip. Thanks to the shape of surface of the carrying apparatus (1), the same form is protected independent from the movement direction thereof in air.

Moreover, in the carrying apparatus (1), more than one depression (60) is provided which can have polygonal, circular and ellipse forms provided on the first lateral wall (10) and on the second lateral wall (20) surfaces. Thanks to said depression (60) structure, a turbulent border layer is formed on the surface of the carrying apparatus (1) and thus, decrease in the drifting coefficient is provided.

Thus, a carrying apparatus (1) is provided for use in drones, which provides carrying of passenger or load in a manner moving with minimum friction and drifting to any direction in air, in aerodynamic lifting-off and landing.

ANALYSIS

In order to be able to obtain speed and pressure distributions around the carrying apparatus (1) as well as the pressure decreases and the reaction forces around the carrying apparatus (1), flow analyses are realized at 45 degrees and in horizontal and orthogonal flight.

The analysis in the orthogonal flight has been evaluated as the first state, the analysis in the horizontal flight has been evaluated as the second state and the 45 degrees orthogonal flight has been evaluated as the third state. For the first state, the speed value of the flight of the carrying apparatus (1) has been entered as 35 km/h. For the second state, the speed of the carrying apparatus (1) has been entered as 100 km/h. In the third state, the speed value of the flight of the carrying apparatus (1) has been entered as 50 km/h. For all states in the analyses, the temperature has been used as 20° C. The mechanical values of the air have been taken as the outer atmosphere value at 1 atm. The outer atmosphere pressure value has been taken as 1 atm.

Figure 4:
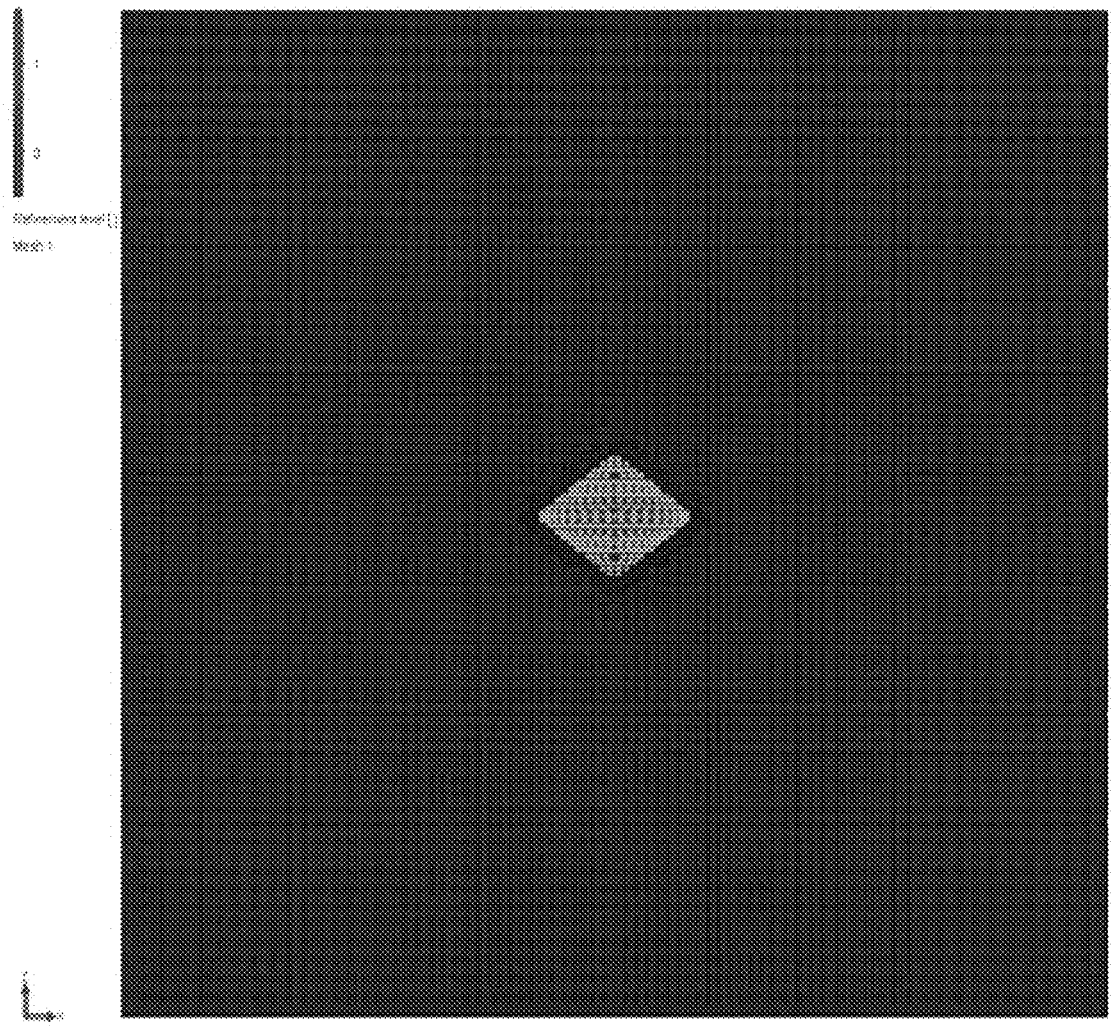
FIG. 4 is the cross sectional view of the solution web of the subject matter carrying apparatus.

The control volume in the analysis has been increased by ten times of the carrying apparatus (1) in every direction and all surfaces have been defined as the outer atmosphere. With reference to FIG. 4, totally approximately 1300000 solution webs have been used in the domain. The cells have been high in frequency around the carrying apparatus (1), and the cells have been low in frequency outwardly.

Figure 5A:
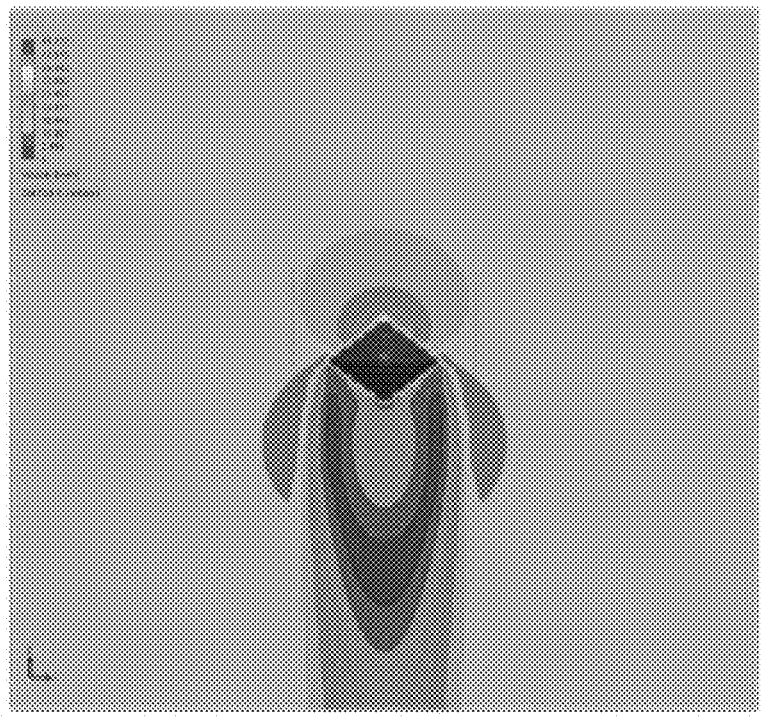
FIG. 5A is the speed distribution around the carrying apparatus with respect to the analysis in the orthogonal flight thereof.
Figure 5B:
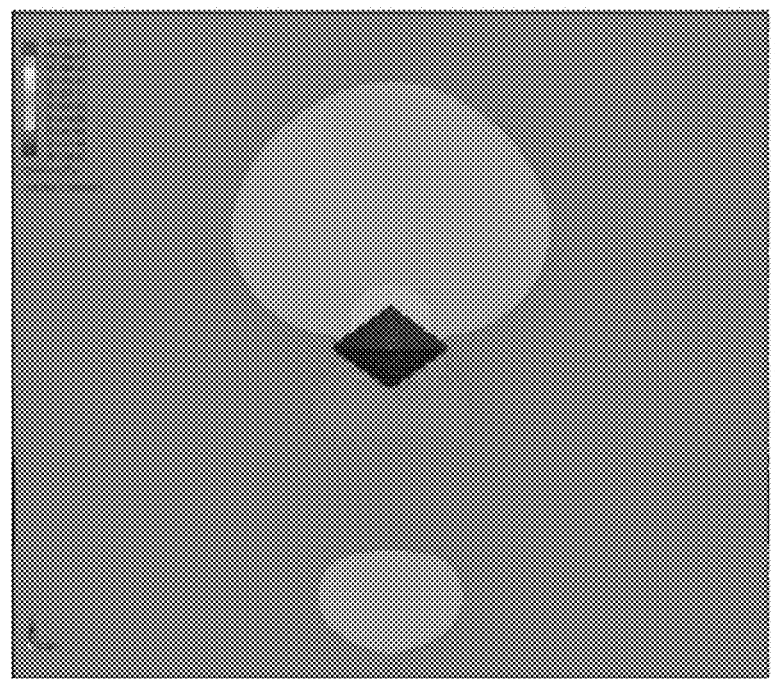
FIG. 5B is the pressure distribution around the carrying apparatus with respect to the analysis in the orthogonal flight thereof.
Figure 5C:
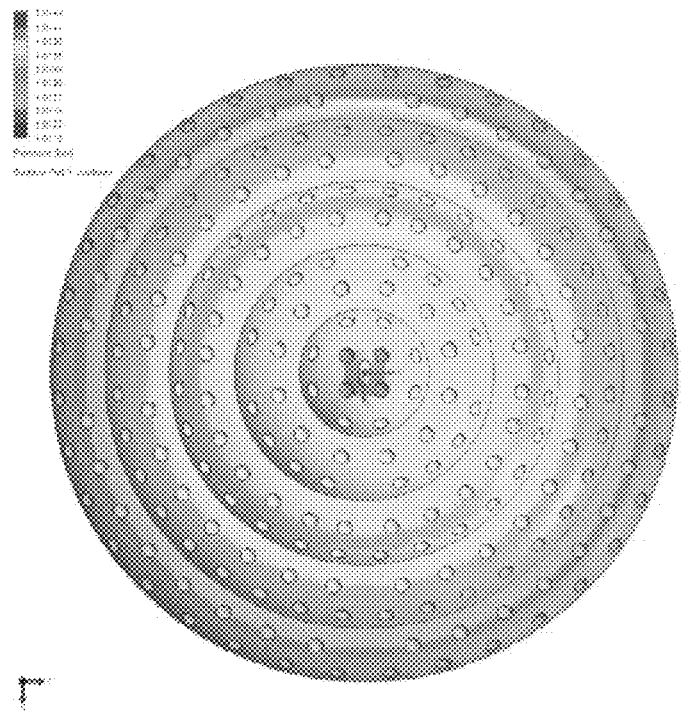
FIGS. 5C and 5D are respectively the upper and lower views of the pressure distribution around the carrying apparatus with respect to the analysis in the orthogonal flight thereof.
Figure 5D:
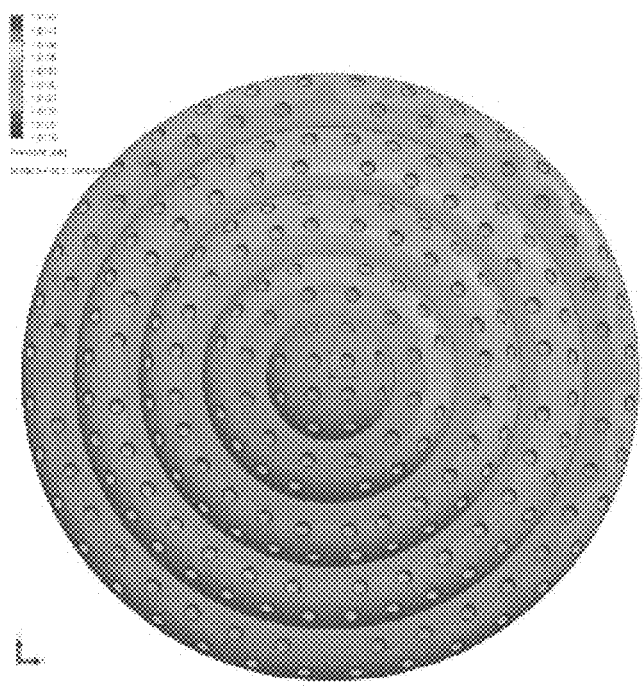
Figure 5E:
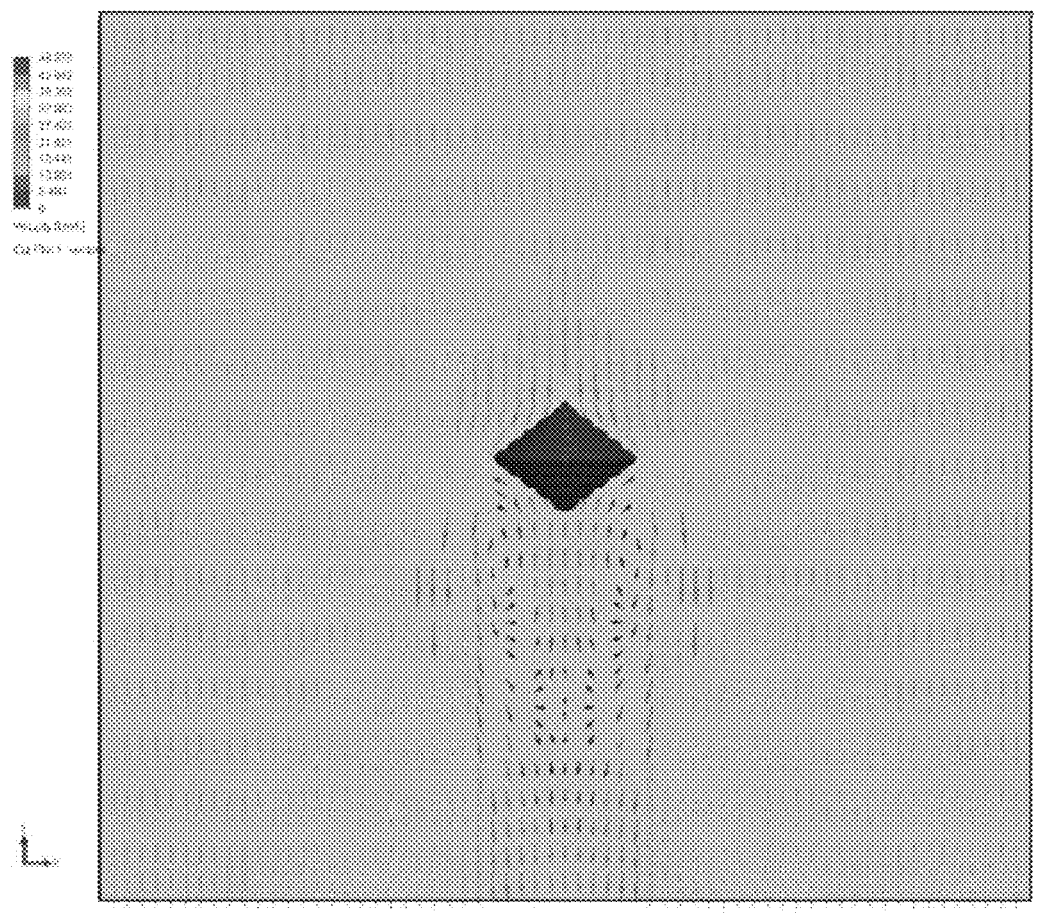
FIG. 5E is the vector speed distribution around the carrying apparatus with respect to the analysis in the orthogonal flight thereof.

For the first state, in other words, in the orthogonal flight of the carrying apparatus (1), the analyses are as follows. The speed distribution around the carrying apparatus (1) has been given in FIG. 5A. The pressure distribution around the carrying apparatus (1) has been given in FIG. 5B. In FIGS. 5C and 5D, the upper and lower views of the pressure distribution around the carrying apparatus (1) are respectively given. In FIG. 5E, the vector speed distribution around the carrying apparatus (1) is given. The force, pressure and shear stress values of the carrying apparatus (1) for the first state are given in Table 1. As seen, for the carrying apparatus (1), ideal aerodynamic values have been reached in the orthogonal flight.

Figure 6A:
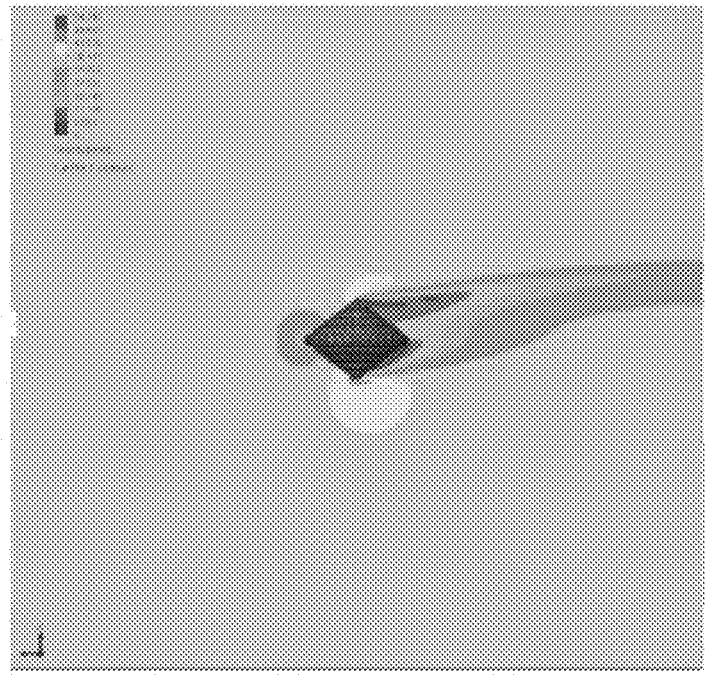
FIG. 6A is the speed distribution around the carrying apparatus with respect to the analysis in the horizontal flight thereof.
Figure 6B:
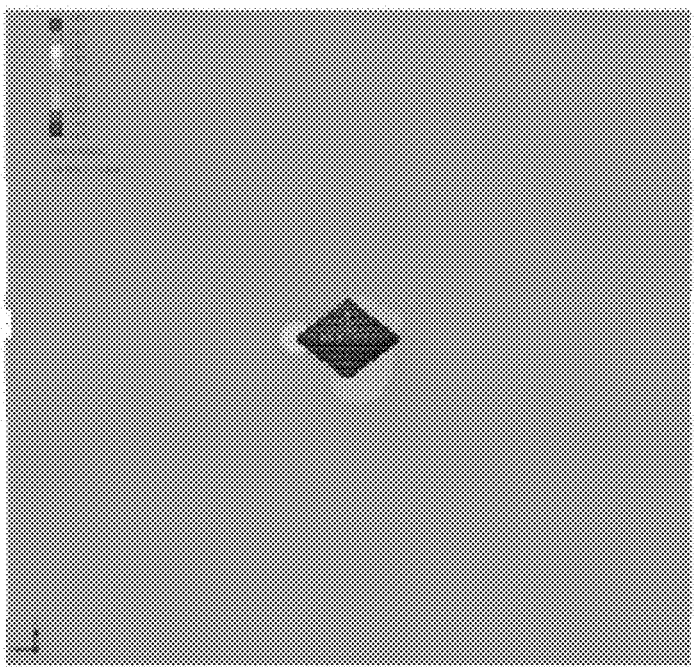
FIG. 6B is the pressure distribution around the carrying apparatus with respect to the analysis in the horizontal flight thereof.
Figure 6C:
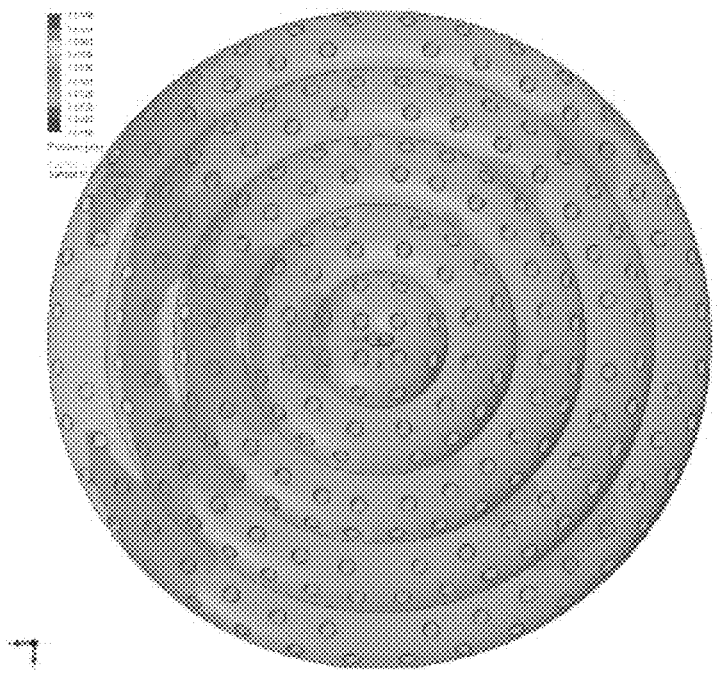
FIGS. 6C and 6D are respectively the upper and lower views of the pressure distribution around the carrying apparatus with respect to the analysis in horizontal flight thereof.
Figure 6D:
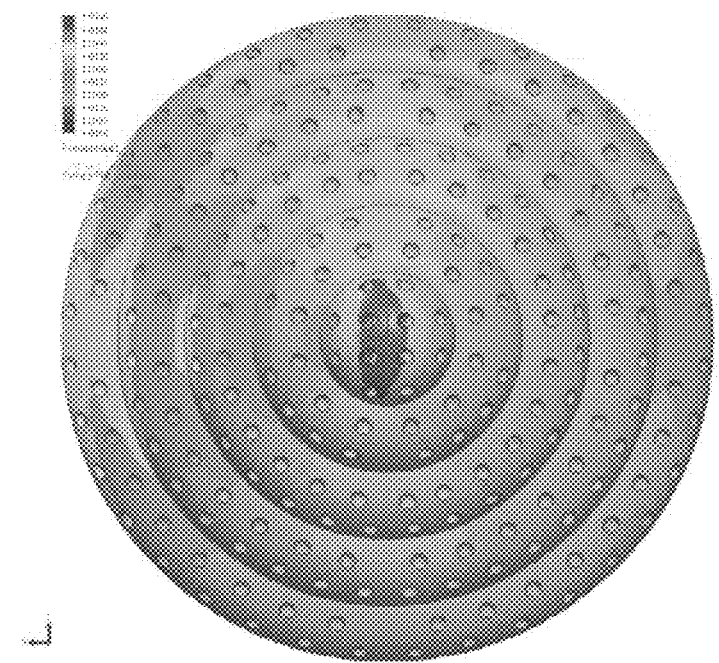
Figure 6E:
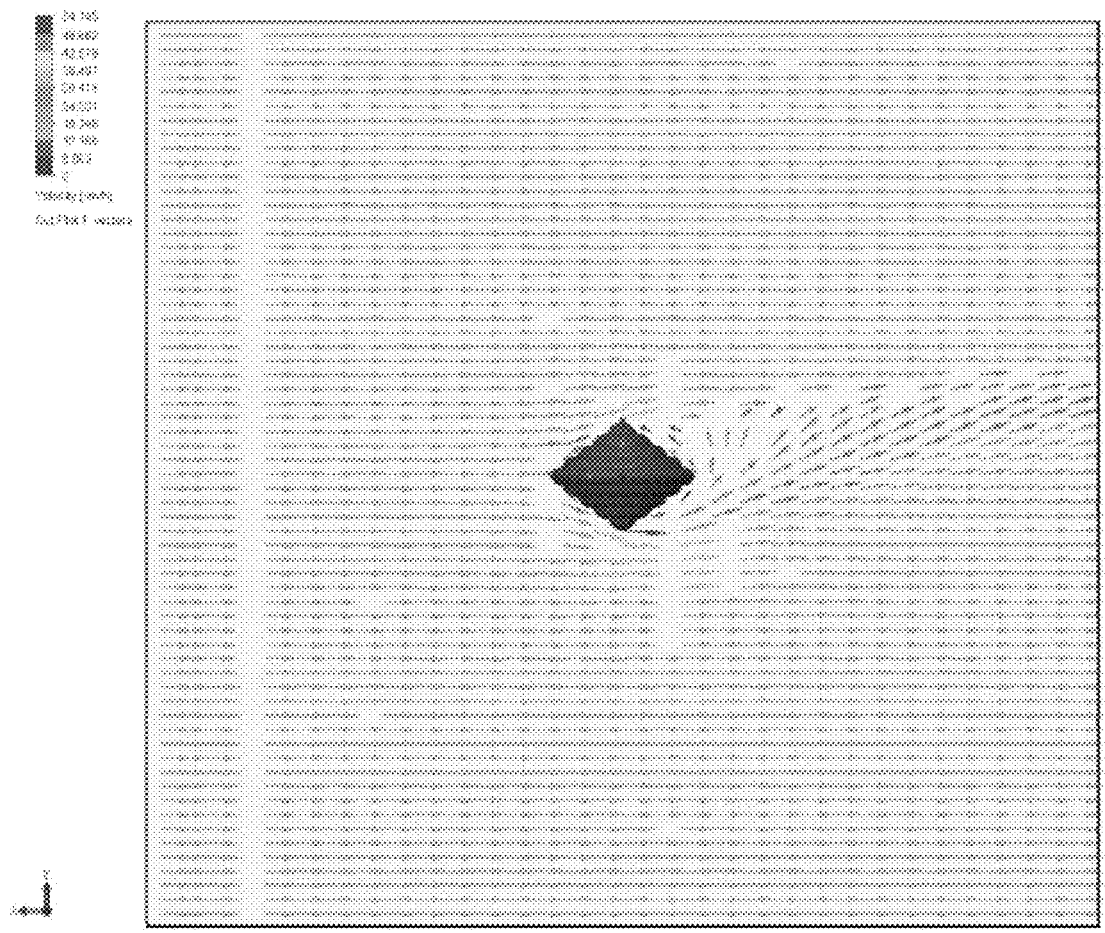
FIG. 6E is the vector speed distribution around the carrying apparatus with respect to the analysis in horizontal flight thereof.

For the second state, in other words, in the horizontal flight of the carrying apparatus (1), the analyses are as follows. The speed distribution around the carrying apparatus (1) is given in FIG. 6A. The pressure distribution around the carrying apparatus (1) is given in FIG. 6B. In FIGS. 6C and 6D, the upper and lower views of the pressure distribution around the carrying apparatus (1) are respectively given. In FIG. 6E, the vector speed distribution around the carrying apparatus (1) is given. The force, pressure and shear stress values of the carrying apparatus (1) for the second state are given in Table 2. As seen, for the carrying apparatus (1), ideal aerodynamic values have been reached in the horizontal flight.

Figure 7A:
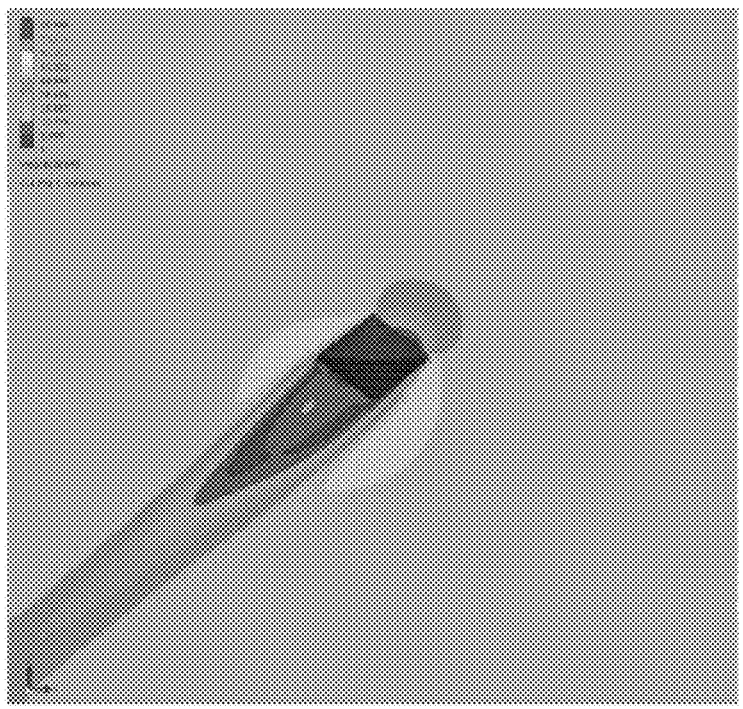
FIG. 7A is the speed distribution around the carrying apparatus with respect to the analysis in 45 degrees orthogonal flight thereof.
Figure 7B:
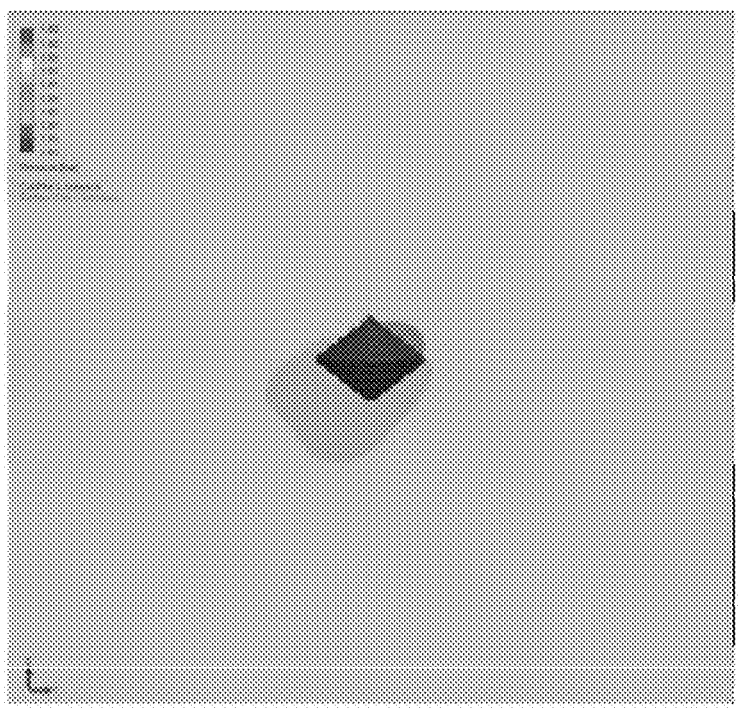
FIG. 7B is the pressure distribution around the carrying apparatus with respect to the analysis in 45 degrees orthogonal flight thereof.
Figure 7C:
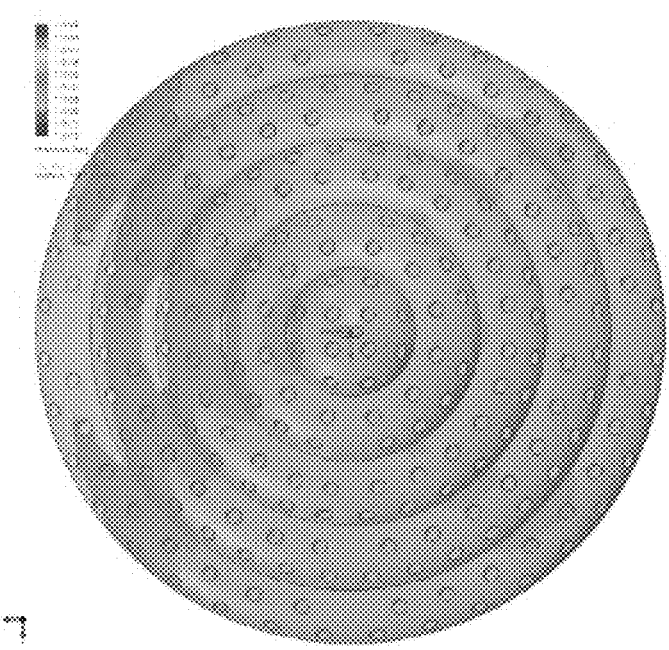
FIGS. 7C and 7D are respectively the upper and lower views of the pressure distribution around the carrying apparatus with respect to the analysis in 45 degrees orthogonal flight thereof.
Figure 7D:
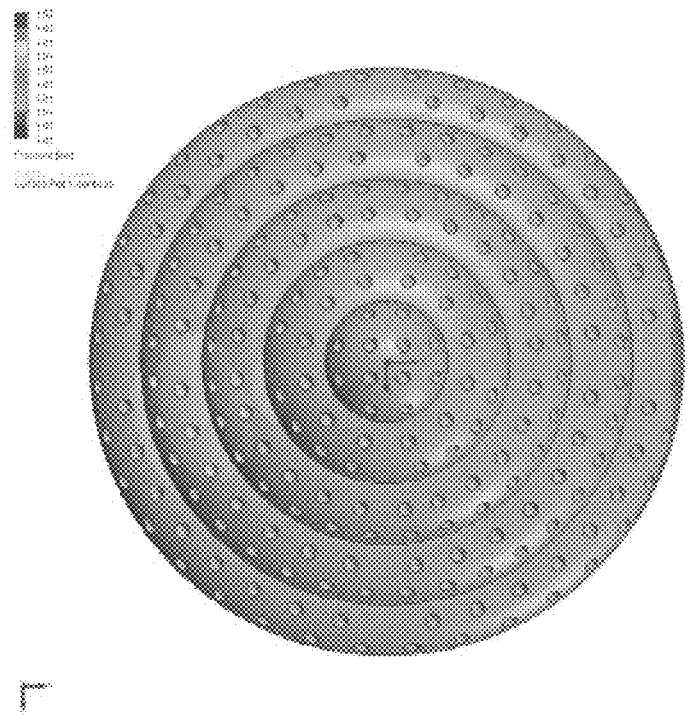
Figure 7E:
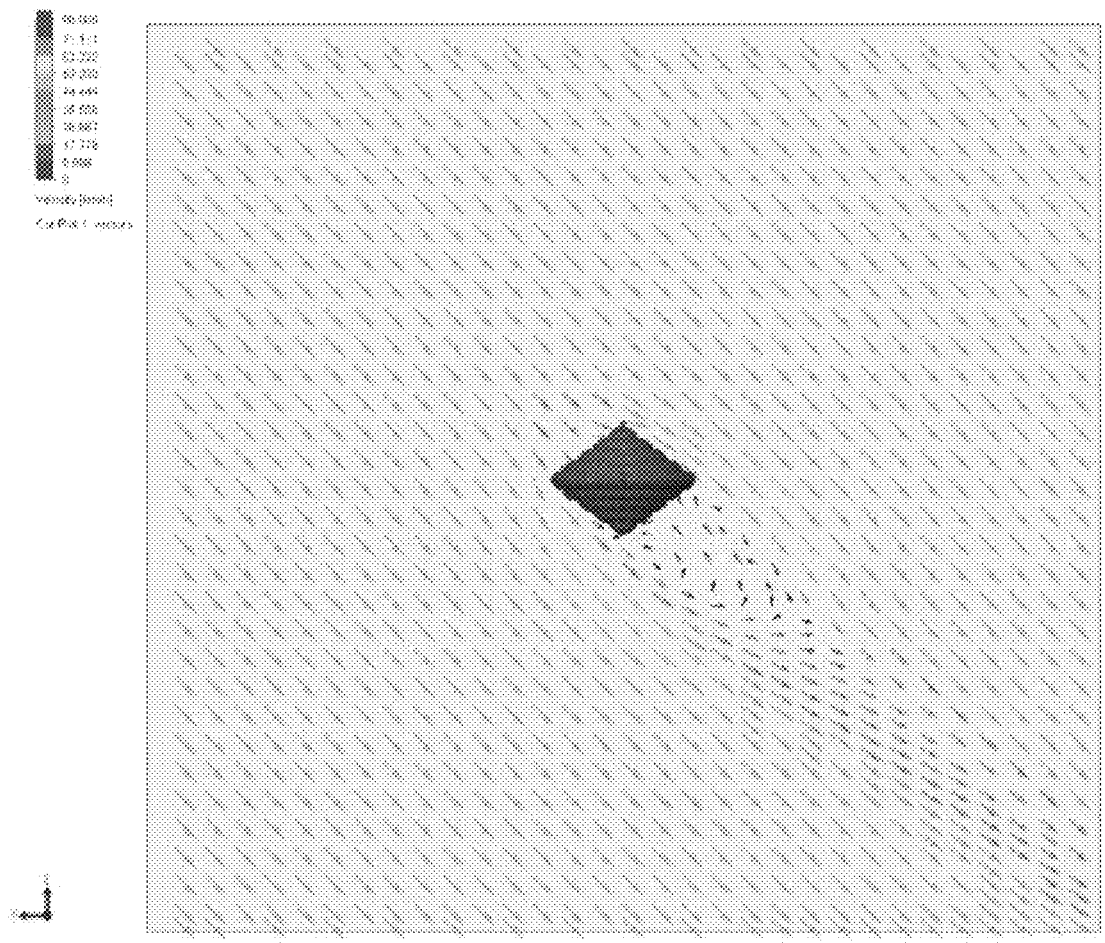
FIG. 7E is vector speed distribution around the carrying apparatus with respect to the analysis in 45 degrees orthogonal flight thereof.

For the third state, in other words, in the 45 degrees orthogonal flight of the carrying apparatus (1), the analyses are as follows. The speed distribution around the carrying apparatus (1) is given in FIG. 7A. The pressure distribution around the carrying apparatus (1) is given in FIG. 7B. In FIGS. 7C and 7D, the upper and lower views of the pressure distribution around the carrying apparatus (1) are respectively given. In FIG. 7E, the vector speed distribution around the carrying apparatus (1) is given. The force, pressure and shear stress values of the carrying apparatus (1) for the third state are given in Table 3. As seen, for the carrying apparatus (1), ideal aerodynamic values have been reached in the 45 degrees orthogonal flight.

TABLE 1

Force, pressure and shear stress values of the carrying apparatus (1) for the first state

|  | Unit | Criterion | First state |
|---|---|---|---|
| Average static pressure | Pa | 1.50 | 101319.35 |
| Average total pressure | Pa | 1.50 | 101319.35 |
| Force | N | 0.913 | 20.939 |
| Force (X) | N | 0.393 | 0.012 |
| Force (Y) | N | 0.321 | −0.038 |
| Force (Z) | N | 0.883 | −20.939 |
| Average shear stress | Pa | 4.84e−03 | 0.12 |
| Average shear stress (X) | Pa | 1.58e−03 | −3.66e−05 |
| Average shear stress (Y) | Pa | 1.27e−03 | −2.12e−04 |
| Average shear stress (Z) | Pa | 1.56e−03 | −0.04 |

TABLE 2

Force, pressure and shear stress values of the carrying apparatus (1) for the second state

|  | Unit | Criterion | Second state |
|---|---|---|---|
| Average static pressure | Pa | 1.18 | 101306.81 |
| Average total pressure | Pa | 1.18 | 101306.81 |
| Force | N | 0.191 | 7.482 |
| Force (X) | N | 0.139 | −5.512 |
| Force (Y) | N | 0.037 | −0.093 |
| Force (Z) | N | 0.257 | −5.058 |
| Average shear stress | Pa | 5.60e−03 | 0.19 |
| Average shear stress (X) | Pa | 3.91e−03 | −0.13 |
| Average shear stress (Y) | Pa | 1.38e−04 | −2.29e−05 |
| Average shear stress (Z) | Pa | 3.55e−04 | −5.83e−03 |

TABLE 3

Force, pressure and shear stress values of the carrying apparatus (1) for the third state

|  | Unit | Criterion | Third state |
|---|---|---|---|
| Average static pressure | Bar | 4.68e−05 | 1.01 |
| Average total pressure | Bar | 4.68e−05 | 1.01 |
| Force | N | 0.688 | 23.196 |
| Force (X) | N | 0.468 | −8.038 |
| Force (Y) | N | 0.345 | −1.566 |
| Force (Z) | N | 0.713 | −21.702 |
| Average shear stress | Bar | 7.62e−08 | 2.51e−06 |
| Average shear stress (X) | Bar | 3.33e−08 | −8.67e−07 |
| Average shear stress (Y) | Bar | 1.13e−08 | −6.15e−08 |
| Average shear stress (Z) | Bar | 1.86e−08 | −6.05e−07 |

When summarized, the reaction forces of the carrying apparatus (1) have been determined as 20.94 N, 7.48 N and 23.2 N respectively for the first state, the second state and the third state. For the shear stresses of the carrying apparatus (1), for the first state, the second state and the third state, the results of 0.12 Pa, 0.19 Pa and 0.251 Pa have been reached respectively. As seen, for the carrying apparatus (1), in all of the three states, ideal aerodynamic values have been reached.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A carrying apparatus configured for drones and similar unmanned air vehicles for carrying a passenger or a load, comprising:
    a center part having a predefined geometrical shape,
    a first lateral wall, wherein the first lateral wall encircles a volume, and the first lateral wall begins in a manner encircling the center part and decreases towards a first end provided at a first direction, and
    a second lateral wall, wherein the second lateral wall begins in the manner encircling the center part and decreases towards a second end provided at a second direction,
    a ring positioned above a center of a top of the first end and attached to the first end, the ring configured to provide a fastening point for carrying the carrying apparatus by a drone,
    wherein a surface of the first lateral wall and a surface of the second lateral wall comprise more than one layer, the first lateral wall in a conical form, the more than one layer positioned one above the other, the second lateral wall in an inverse-conical form, the more than one layer positioned one below the other.

2. The carrying apparatus according to claim 1, wherein the center part is in a circular form.

3. The carrying apparatus according to claim 1, wherein more than one depression is provided with respect to one or ones of polygonal, circular and ellipse forms provided on the surface of the first lateral wall and on the surface of the second lateral wall.

4. The carrying apparatus according to claim 3, wherein the more than one depression are provided on a majority of the surface of the first lateral wall and on a majority of the surface of the second lateral wall.

5. The carrying apparatus according to claim 4, wherein the more than one depression are evenly spaced from each other in a vertical direction.

6. The carrying apparatus according to claim 5, wherein the more than one depression are evenly spaced from each other in a horizontal direction.

7. The carrying apparatus according to claim 1, wherein a number of layers on the surface of the first lateral wall is greater than three, each layer having a base wider than a top, a top layer being semi-circular and forming a top of the carrying apparatus.

8. The carrying apparatus according to claim 1, wherein a number of layers on the surface of the second lateral wall is greater than three, each layer having a top wider than a base, a bottom layer being semi-circular and forming a bottom of the carrying apparatus.

9. The carrying apparatus according to claim 1, wherein the first lateral wall and the second lateral wall are substantially the same.

* * * * *